United States Patent
Lai et al.

(10) Patent No.: US 8,060,761 B2
(45) Date of Patent: Nov. 15, 2011

(54) ELECTRICAL POWER SHARING CIRCUIT HAS CONTROL UNIT FOR CONTROLLING PERFORMANCE OF CPU AND GPU BASED ON A REFERENCE VALUE

(75) Inventors: Yuan-Bi Lai, Taipei (TW); Shun-Jung Chang, Taipei (TW)

(73) Assignee: Asustek Computer Inc., Peitou (TW)

( * ) Notice: Subject to any disclaimer, the term of this patent is extended or adjusted under 35 U.S.C. 154(b) by 577 days.

(21) Appl. No.: 12/285,041

(22) Filed: Sep. 29, 2008

(65) Prior Publication Data

US 2009/0100277 A1    Apr. 16, 2009

(30) Foreign Application Priority Data

Oct. 16, 2007 (TW) ................. 96138638 A

(51) Int. Cl.
*G06F 1/26* (2006.01)

(52) U.S. Cl. ...................... 713/300; 713/320
(58) Field of Classification Search .......... 713/300, 713/320
See application file for complete search history.

(56) References Cited

U.S. PATENT DOCUMENTS

| | | | |
|---|---|---|---|
| 6,938,176 B1 * | 8/2005 | Alben et al. | 713/323 |
| 7,178,043 B2 | 2/2007 | Nakazato | |
| 7,619,444 B1 * | 11/2009 | Shaikh et al. | 326/81 |
| 2003/0183373 A1 | 10/2003 | Sarraf et al. | |
| 2007/0043964 A1 * | 2/2007 | Lim et al. | 713/322 |
| 2007/0049133 A1 * | 3/2007 | Conroy et al. | 439/894 |
| 2007/0049134 A1 * | 3/2007 | Conroy et al. | 439/894 |
| 2007/0050647 A1 * | 3/2007 | Conroy et al. | 713/300 |
| 2007/0113109 A1 | 5/2007 | Kim | |

* cited by examiner

*Primary Examiner* — Chun Cao
(74) *Attorney, Agent, or Firm* — Bacon & Thomas, PLLC

(57) ABSTRACT

An electrical power sharing circuit applied in a computer system includes first and second sense units and first and second control units. The first and second sense units are electrically connected to a central processing unit (CPU) and a graphical processing unit (GPU) of the computer system and thus generate first and second sense values, respectively. The first control unit is electrically connected to the first and second sense units, the CPU and the GPU and receives the first and second sense values. The second control unit is electrically connected to the first and second sense units and the first control unit, receives the first and second sense values and provides a reference value to the first control unit. The first control unit controls performances of the CPU and the GPU according to the reference value.

22 Claims, 5 Drawing Sheets

| CPU/GPU Temperature | 0~49 | 50~59 | 60~69 | 70~84 | >85 |
|---|---|---|---|---|---|
| Pw_th1/Pw_th2 | 55W | 40W | 35W | 30W | 25W |
| Heat dissipating module 22 Fan rotating speed(RPM) | 0 | 1800 | 2800 | 2800 | 2800 |
| Noise level(db) | 17.1 | 23.2 | 33.4 | 33.4 | 33.4 |

FIG. 4

| CPU/GPU Temperature | 0~49 | 50~59 | 60~69 | 70~84 | >85 |
|---|---|---|---|---|---|
| Pw_th1/Pw_th2 | N/A (Max.55W) | N/A (Max.55W) | N/A (Max.55W) | N/A (Max.55W) | N/A (Max.55W) |
| Heat dissipating module Fan rotating speed(RPM) | 0 | 1800 | 2800 | 3600 | 4000 |
| Noise level(db) | 17.1 | 23.2 | 33.4 | 37.5 | 42.3 |

FIG. 5(PRIOR ART)

| Item | 1 | 2 | 3 | 4 | 5 | 6 | 7 | 8 |
|---|---|---|---|---|---|---|---|---|
| CPU test type | SV 2.0G T7300 | LV 1.60G L7500 | ULV 1.20G U7600 | SV 2.0G T7300 | SV 2.0G T7300 | SV 2.0G T7300 | SV 2.0G T7300 | SV 2.0G T7300 |
| Pw_th1/Pw_th2 | N/A | N/A | N/A | 40W | 35W | 30W | 25W | 20W |
| Thermal design power | 35+20W | 17+20W | 10+20W | 40W | 35W | 30W | 25W | 20W |
| 3DMark 2005 | 7680 | 7593 | 6862 | 7690 | 7681 | 7659 | 7453 | 7044 |
| 3DMark 2006 | 3772 | 3653 | 3489 | 3774 | 3771 | 3764 | 3679 | 3591 |
| SM2.0 Score | 1554 | 1549 | 1560 | 1556 | 1554 | 1555 | 1543 | 1548 |
| DR/SM3.0 Score | 1387 | 1386 | 1386 | 1386 | 1387 | 1387 | 1387 | 1385 |
| CPU Score | 1767 | 1427 | 1075 | 1772 | 1768 | 1742 | 1509 | 1286 |
| PCMark 2005 | 5192 | 4527 | 3772 | 5183 | 5163 | 5080 | 4815 | 4384 |
| CPU Score | 5044 | 4050 | 3012 | 5046 | 5058 | 4957 | 4588 | 4147 |
| Memory Score | 4250 | 3744 | 2994 | 4251 | 4245 | 4249 | 4235 | 4081 |
| Graphics Score | 5655 | 5148 | 4942 | 5598 | 5400 | 5576 | 5235 | 5088 |
| HDD Score | 3892 | 3789 | 3882 | 3873 | 3935 | 3890 | 3954 | 3837 |

FIG. 6

ELECTRICAL POWER SHARING CIRCUIT HAS CONTROL UNIT FOR CONTROLLING PERFORMANCE OF CPU AND GPU BASED ON A REFERENCE VALUE

This application claims the benefit of Taiwan application Serial No. 096138638, filed Oct. 16, 2007, the subject matter of which is incorporated herein by reference.

BACKGROUND OF THE INVENTION

1. Field of the Invention

The invention relates in general to an electrical power sharing circuit, and more particularly to an electrical power sharing circuit capable of dynamically adjusting the energy allocated between a central processing unit (CPU) and a graphical processing unit (GPU) of a computer system according to an operation mode of the computer system.

2. Description of the Related Art

In the modern notebook computer, a shared heat dissipating module (shared cooling module) is usually designed to cool a central processing unit (CPU) and a graphic processing unit (GPU), which have the maximum power consumption value and generate the maximum thermal energy in the notebook computer, in order to reduce the size of the notebook computer and save the available space. In addition, the heat dissipating ability of the conventional heat dissipating module has to be greater than or equal to a sum of the thermal design power (TDP) of the CPU and the TDP of the GPU so that the thermal energy of the CPU and the GPU can be dissipated effectively.

Because the heat dissipating ability is in directly proportional to the size of the heat dissipating module, the size of the adopted heat dissipating module has to be increased in order to enhance the heat dissipating ability of the computer system. For example, the heat dissipating module having a fan has the enhanced heat dissipating ability when the size of the fan is increased. However, the size of the heat dissipating module also has to be correspondingly increased. That is, when the CPU and the GPU having the higher performances, the higher power consumption value and the higher thermal energy are used, a larger heat dissipating module has to be adopted in order to provide the sufficient heat dissipating ability. Thus, the area of the main board occupied by the conventional heat dissipating module becomes larger, and the other area of the main board, on which other elements can be disposed, is thus reduced so that the miniaturized notebook computer cannot be easily implemented.

In addition, the CPU and the GPU having the better performances also have the increased electrical power consumption values.

SUMMARY OF THE INVENTION

The invention is directed to an electrical power sharing circuit and a method thereof capable of dynamically adjusting the energy allocated between a central processing unit (CPU) and a graphical processing unit (GPU) of a computer system according to an operation mode of the computer system. Thus, the size of a heat dissipating module of the computer system can be effectively reduced, and an area of a circuit board occupied by the heat dissipating module can be thus reduced. Meanwhile, the power-saving effect of the system can be further achieved according to the electrical power sharing technology.

According to a first aspect of the present invention, an electrical power sharing circuit applied in a computer system is provided. The computer system includes a central processing unit (CPU) and a graphical processing unit (GPU). The electrical power sharing circuit includes first and second sense units and first and second control units. The first and second sense units are electrically connected to the CPU and the GPU and thus generate a first sense value and a second sense value, respectively. The first control unit is electrically connected to the first sense unit, the second sense unit, the CPU and the GPU, and thus receives the first sense value and the second sense value. The second control unit is electrically connected to the first sense unit, the second sense unit and the first control unit, and thus receives the first sense value and the second sense value and provides a reference value to the first control unit. The first control unit controls performances of the CPU and the GPU according to the reference value.

According to a second aspect of the present invention, an electrical power sharing method applied in a computer system is provided. The computer system includes a central processing unit (CPU) and a GPU. The electrical power sharing method includes the steps of: generating a first sense value and a second sense value respectively corresponding to the CPU and the GPU; generating a reference value according to the first sense value and the second sense value; and controlling performances of the CPU and the GPU according to the reference value.

The invention will become apparent from the following detailed description of the preferred but non-limiting embodiments. The following description is made with reference to the accompanying drawings.

BRIEF DESCRIPTION OF THE DRAWINGS

FIG. 4 shows an example of a look-up table.

FIG. 5 (Prior Art) shows a look-up table of a fan rotating speed and a corresponding CPU temperature in a conventional heat dissipating module.

FIG. 6 shows test results of a computer system 10 of the first embodiment and the conventional computer system when several system estimating software programs are executed.

DETAILED DESCRIPTION OF THE INVENTION

Figure 1:
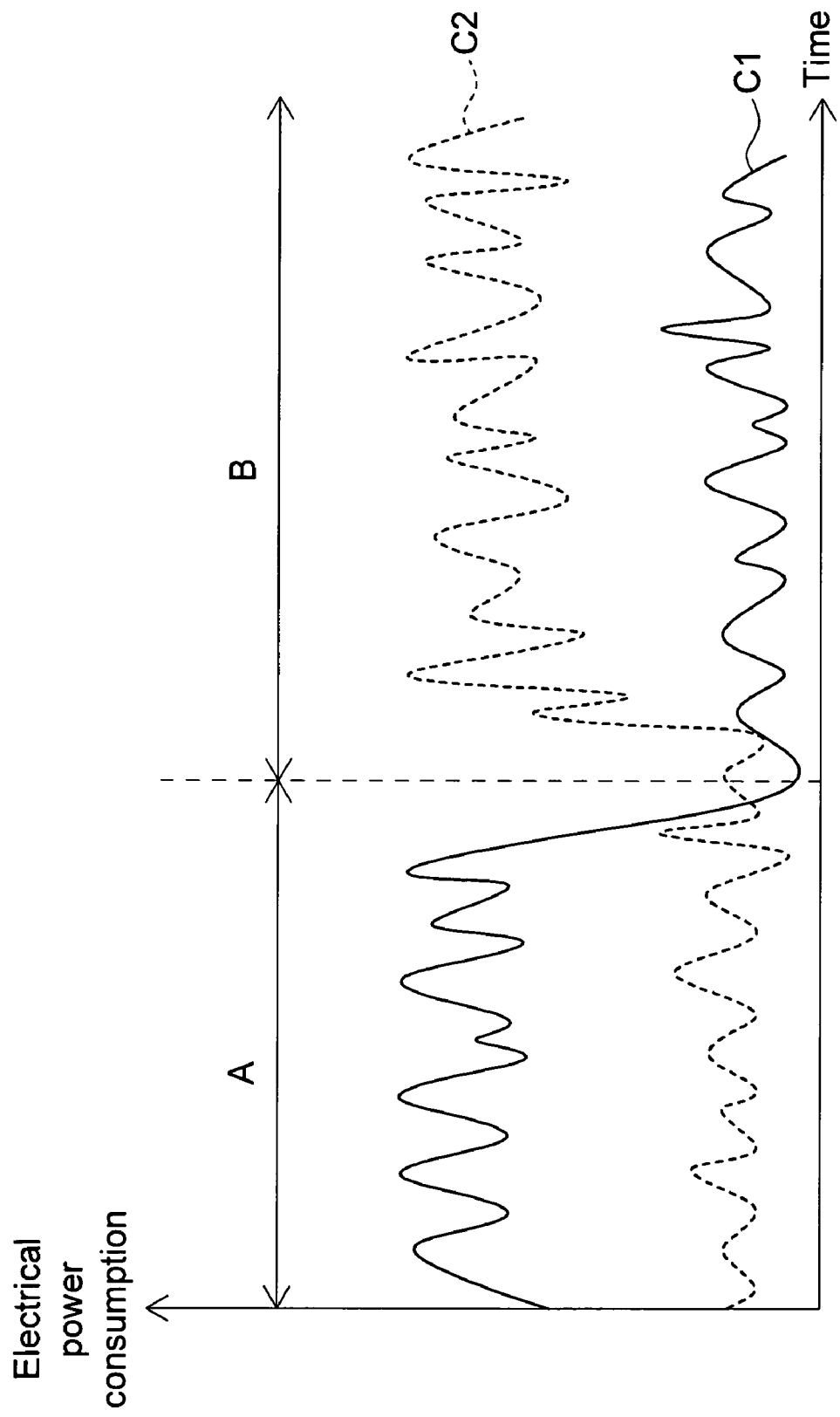
FIG. 1 (Prior Art) shows waveforms of power consumption values corresponding to a central processing unit (CPU) and a graphical processing unit (GPU) of a conventional computer system in different operation modes.

FIG. 1 (Prior Art) shows waveforms of power consumption values corresponding to a central processing unit (CPU) and a graphical processing unit (GPU) of a conventional computer system in different operation modes. As shown in FIG. 1, waveforms C1 and C2 respectively represent the power consumption waveforms of the CPU and the GPU, the time slot A represents that the system performs the CPU-dominated operation, and the time slot B represents that the system performs the GPU-dominated operation. The CPU-dominated operation represents that the operation performed by the computer system is mainly performed by the CPU. For example, the CPU-dominated operation may correspond to the memory accessing operation, the hard disk accessing operation, the application software executing operation or the program command executing operation. The GPU-dominated operation represents that the operation performed by the computer system is mainly performed by the GPU. The GPU-dominated operation may correspond to the 3D image processing operation.

As shown in the waveform C1, the power consumption of the CPU is higher than that of the GPU in the time slot A, while the power consumption of the GPU is higher than that of the CPU in the time slot B. However, in the time slot A, the power consumption value of the GPU approaches to the power consumption value in its idle state. In the time slot B, the power consumption value of the CPU approaches to the power consumption value in its idle state. Thus, when the CPU-dominated operation is being performed, the computer system almost needs not to use the operation resource of the GPU; and when the GPU-dominated operation is being performed, the computer system almost needs not to use the operation resource of the CPU.

Because the computer system has the above-mentioned phenomena, the electrical power sharing circuit of the invention can dynamically allocate the power provided to the CPU and the GPU according to the operation mode of the computer system without influencing the original performances of the CPU and the GPU. Thus, the same performance can be kept without the use of the conventional large-sized heat dissipating module so that the size of the heat dissipating module can be reduced. In addition, the area of the circuit board occupied by the heat dissipating module can be saved so that the miniaturized notebook computer can be implemented more easily.

Figure 2:
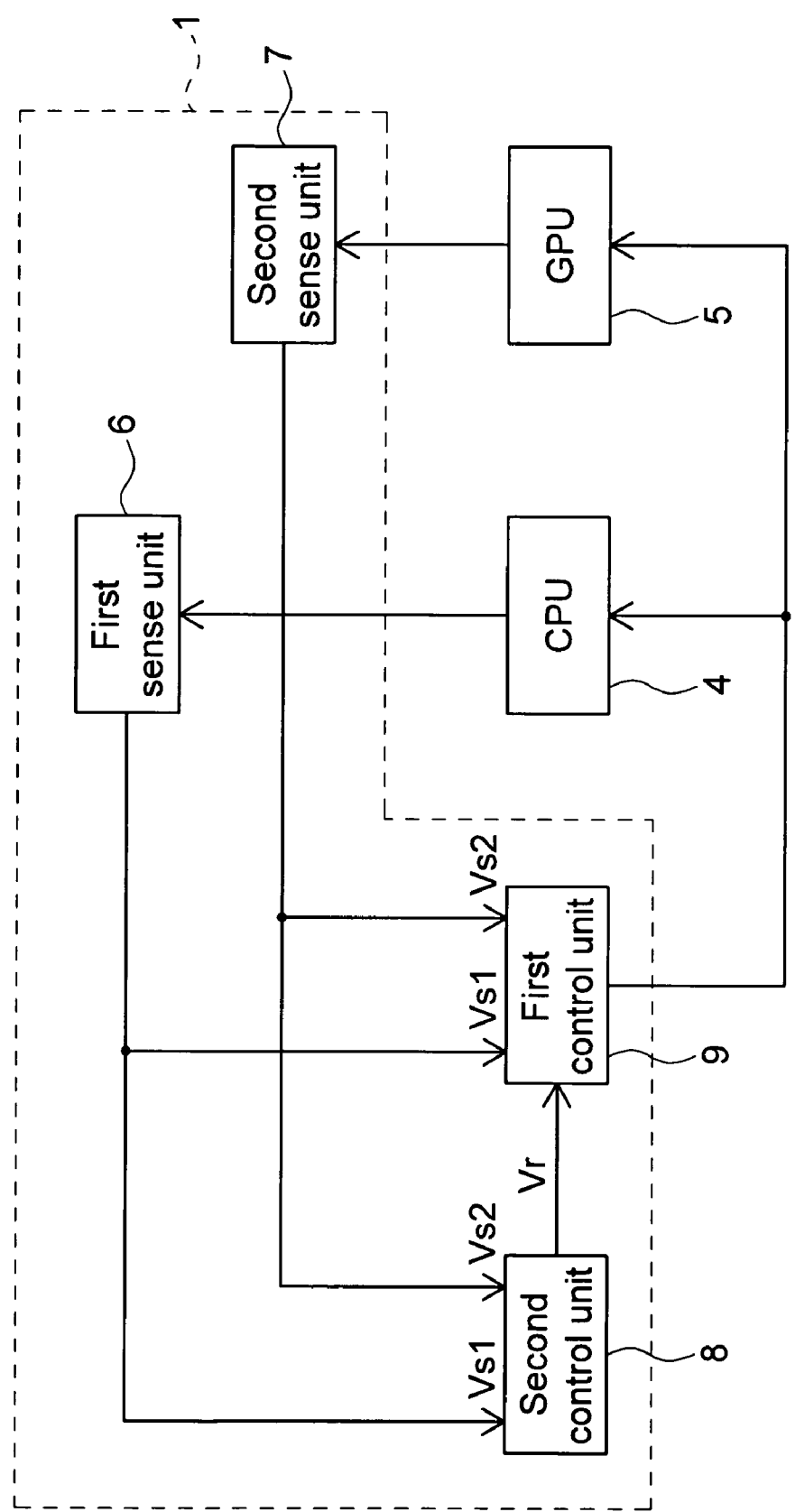
FIG. 2 is a block diagram showing an electrical power sharing circuit according to an embodiment of the invention.

FIG. 2 is a block diagram showing an electrical power sharing circuit 1 according to an embodiment of the invention. As shown in FIG. 2, the electrical power sharing circuit 1 is applied in a computer system 2, which includes a CPU 4 and a GPU 5. The electrical power sharing circuit 1 includes a first sense unit 6, a second sense unit 7, a first control unit 9, and a second control unit 8.

The first sense unit 6 and the second sense unit 7 are respectively electrically connected to the CPU 4 and the GPU 5 and correspondingly generate a first sense value Vs1 and a second sense value Vs2. The second control unit 8 electrically connected to the first sense unit 6 and the second sense unit 7 receives the first sense value Vs1 and the second sense value Vs2, and provides at least one reference value Vr to the first control unit 9.

Meanwhile, the first control unit 9 electrically connected to the first sense unit 6 and the second sense unit 7 receives the first sense value Vs1 and the second sense value Vs2. The first control unit 9 is also electrically connected to the CPU 4 and the GPU 5, and controls the performances of the CPU 4 and the GPU 5 according to the reference value Vr provided by the second control unit 8.

For example, the first control unit 9 may include an adder unit and at least one comparator unit. The adder unit adds the first sense value Vs1 and the second sense value Vs2 together to obtain a sum of the sense values. The comparator unit compares the sum of the sense values with the reference value Vr.

The reference value Vr may include a first reference value and a second reference value. When the sum of the sense values is greater than the first reference value, the comparator unit outputs a first control signal to lower the performance of the GPU. When the sum of the sense values is greater than the second reference value, the comparator unit outputs a second control signal to lower the performance of the CPU.

The above-mentioned performance includes the power supply, the working clock, the internal frequency multiplier or the power state of the CPU or the GPU. The first and second sense units are power sense units. For example, the first sense value Vs1 and the second sense value Vs2 are respectively a first power value and a second power value. The invention will be described with reference to several embodiments.

First Embodiment

Figure 3:
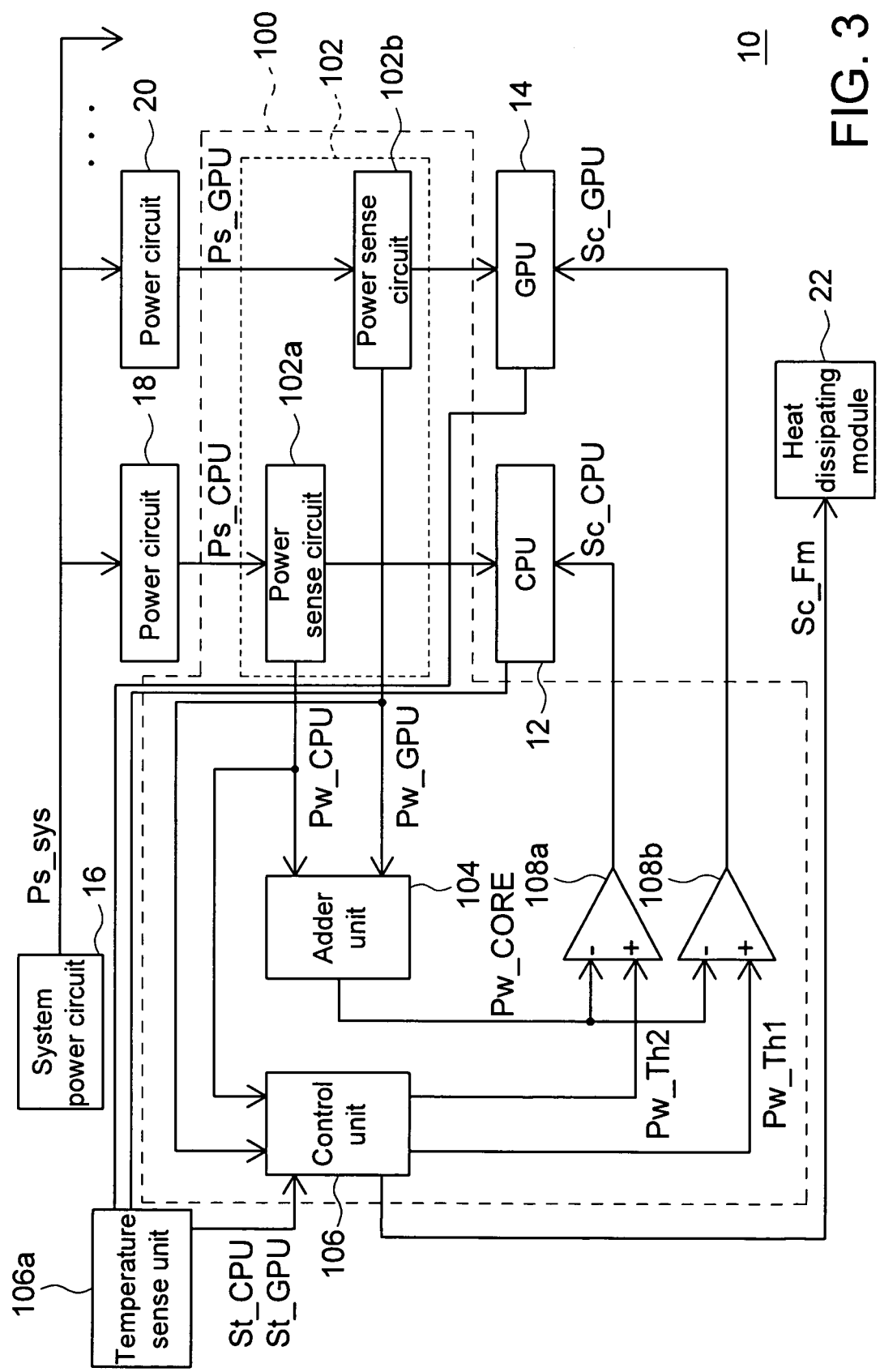
FIG. 3 is a block diagram showing an electrical power sharing circuit according to a first embodiment of the invention.

FIG. 3 is a block diagram showing an electrical power sharing circuit according to a first embodiment of the invention. As shown in FIG. 3, the performance to be adjusted or controlled is the working clock in this embodiment.

In this embodiment, a computer system 10 includes an electrical power sharing circuit 100, a central processing unit (CPU) 12, a graphic processing unit (GPU) 14, a system power circuit 16, power circuits 18 and 20, and a heat dissipating module 22. The system power circuit 16 provides a system power signal Ps_Sys. The power circuits 18 and 20 respectively receive the system power signal Ps_Sys and transform the voltage of the system power signal Ps_Sys into the voltages suitable for the CPU 12 and the GPU 14. Thus, the power circuits 18 and 20 generate power signals Ps_CPU and Ps_GPU to be supplied to the CPU 12 and the GPU 14 so that the CPU 12 and the GPU 14 can operate.

The CPU 12 has a high-frequency operation mode and a low frequency operation mode. The CPU 12 selects to enter the high-frequency operation mode or the low frequency operation mode according to a state of a control signal Sc_CPU received via a control pin or control pins. The GPU 14 also has a high-frequency operation mode and a low frequency operation mode. The GPU 14 can enter the high-frequency operation mode or the low frequency operation mode according to a state of a control signal Sc_GPU received via a control pin or control pins. In the general condition, the CPU 12 and the GPU 14 operate in the high-frequency operation modes.

The control pins of the CPU 12 and the GPU 14 may be general purpose input output (GPIO) pins. The CPU 12 and the GPU 14 may respectively enter different operation modes according to the levels of the control signals Sc_CPU and Sc_GPU. In an example, the maximum power consumption values of the CPU 12 in the high-frequency operation mode and the low frequency operation mode are respectively equal to 35 watts (W) and 12 W. The maximum power consumption values of the GPU 14 are respectively equal to 20 W and 8 W when the GPU 14 is operating in the high-frequency operation mode and the low frequency operation mode.

The electrical power sharing circuit 100 can judge whether the operation performed by the computer system 10 pertains to a CPU-dominated operation or a GPU-dominated operation. Then the electrical power sharing circuit 100 dynamically controls the frequencies of the operation clocks of the GPU 14 and the CPU 12 to effectively control the power consumption values and the emitted thermal energies of the GPU 14 and the CPU 12, respectively. In this example, the electrical power sharing circuit 100 includes a power sense unit 102, an adder unit 104, a control unit 106, and comparator units 108a and 108b.

The power sense unit 102 includes power sense circuits 102a and 102b, which are respectively coupled to and between the power circuit 18 and the CPU 12, and between the power circuit 20 and the GPU 14. The power sense circuits 102a and 102b may output power values Pw_CPU and Pw_GPU according to the power signals Ps_CPU and Ps_GPU (e.g., the current value and the voltage value thereof, respectively. However, the power values Pw_CPU and Pw_GPU may also be directly generated by the power circuits 18 and 20 (not shown). The power values Pw_CPU and Pw_GPU respectively correspond to the power consumption values of the CPU 12 and the GPU 14. The adder unit 104 adds the power values Pw_CPU and Pw_GPU together to obtain a power sum Pw_CORE.

The control unit 106 judges whether the operation performed by the computer system 10 pertains to the CPU-dominated operation or the GPU-dominated operation according to the power values Pw_CPU and Pw_GPU, and correspondingly outputs reference values Pw_Th1 and Pw_Th2. When the operation pertains to the CPU-dominated operation, the thermal power threshold value Pw_Th1 indicates a dominated threshold value. When the operation pertains to the GPU-dominated operation, the thermal power threshold value Pw_Th2 indicates the dominated threshold value. For example, when the operation pertains to the CPU-dominated operation, the thermal power threshold value Pw_Th2 indicates a non-dominated threshold value. When the operation pertains to the GPU-dominated operation, the thermal power threshold value Pw_Th1 indicates the non-dominated threshold value.

The maximum power consumption value of the CPU 12 is 35 W, and the maximum power consumption value of the GPU 14 is 20 W. The sum of both the values is a maximum power consumption sum equal to 55 W. Preferably, the non-dominated threshold value is greater than or equal to a maximum of the maximum power consumption sums. For example, the non-dominated threshold value is equal to 55 W. The dominated threshold value is equal to 43 W smaller than the maximum power consumption sum (55 W). The maximum thermal power values of the heat dissipating module to be matched with the CPU 12 and the GPU 14 may be set according to the dominated threshold value. That is, the maximum thermal power of the heat dissipating module may be equal to 43 W in this embodiment.

The comparator unit 108a compares the power sum Pw_CORE outputted from the adder unit 104 with the reference value Pw_Th2 outputted from the control unit 106, and changes the level of the control signal Sc_CPU according to the comparison result to control the corresponding operation mode of the CPU 12. When the power sum Pw_CORE is greater than the reference value Pw_Th2, the comparator unit 108a adjusts the level of the control signal Sc_CPU from a first level (e.g., a high level) to a second level (e.g., a low level) to control the CPU 12 to enter the low frequency operation mode. If the GPU 14 is in the high-frequency operation mode at this time, the sum of the maximum power consumption values of the CPU 12 and the GPU 14 is substantially equal to 32 W (=12 W+20 W).

Similarly, the comparator unit 108b compares the power sum Pw_CORE outputted from the adder unit 104 with the reference value Pw_Th1 outputted from the control unit 106, and adjusts the level of the control signal Sc_GPU to control the GPU 14 to enter the corresponding operation mode according to the comparison result. When the power sum Pw_CORE is greater than the reference value Pw_Th1, the comparator unit 108b adjusts the level of the control signal Sc_GPU from a third level (e.g., the high level) to a fourth level (e.g., the low level) to control the GPU 14 to enter the low frequency operation mode. If the CPU 12 is in the high-frequency operation mode at this time, the sum of the maximum power consumption values of the CPU 12 and the GPU 14 is substantially equal to 43 W (=35 W+8 W).

As mentioned hereinabove, the electrical power sharing circuit 100 of this embodiment judges whether the operation performed by the computer system 10 pertains to the CPU-dominated operation or the GPU-dominated operation. Then, the electrical power sharing circuit 100 lowers the frequency of the operation clock of the CPU 12 or the GPU 14 which does not dominate the operation to lower its performance and thus to lower its power consumption when the sum of the power consumption values exceeds the reference value Pw_Th1 or Pw_Th2. Thus, the energy allocated between the CPU 12 and the GPU 14 can be dynamically adjusted in order to lower the consumed energy of the CPU 12 or the GPU 14 which does not dominate the operation. For example, after the frequency of the operation clock of the CPU 12 or the GPU 14 is lowered, the sum of the maximum power consumption values of the CPU 12 and the GPU 14 may be lowered from 55 W to 32 W or 43 W. Thus, the electrical power sharing circuit 100 of this embodiment can effectively lower the overall emitted thermal energy of the CPU 12 and the GPU 14 of the computer system 10.

In addition, because the maximum power consumption sum of the CPU 12 and the GPU 14 is lowered, only the heat dissipating module 22 has to be properly and correspondingly provided. For example, only the heat dissipating module 22 with the heat dissipating ability of 43 W has to be provided. Consequently, the maximum power consumption sum of this embodiment is lower than that of the prior art, so the required size of the heat dissipating module 22 is smaller than that of the conventional heat dissipating module. The heat dissipating module 22 according to this embodiment of the invention occupies the smaller area on the circuit board than the conventional heat dissipating module does.

In detail, the control unit 106 of this embodiment can judge whether the operation pertains to the CPU-dominated operation or the GPU-dominated operation according to the power consumption value sum of the CPU 12 and the GPU 14 during a fixed time period. The control unit 106 respectively calculates first summated power and second summated power of the power values Pw_CPU and Pw_GPU in one fixed time period. The control unit 106 obtains a first power ratio by dividing the first summated power by the maximum power consumption value of the CPU 12 in this fixed time period. The control unit 106 also obtains a second power ratio by dividing the second summated power by the maximum power consumption value of the GPU 14 in this fixed time period. When the first power ratio is greater than the second power ratio, the control unit 106 judges that the operation pertains to the GPU-dominated operation. When the second power ratio is greater than the first power ratio, the control unit 106 judges that the operation pertains to the GPU-dominated operation.

The comparator units 108a and 108b are respectively implemented by first and second operational amplifiers. The positive ends of the first and second operational amplifiers respectively receive the reference values Pw_Th2 and Pw_Th1. The negative ends of the first and second operational amplifiers receive the power sum Pw_CORE. For example, if the operation is dominated by the CPU 12 at this time, the reference value Pw_Th1 is equal to the dominated threshold value (e.g., 43 W), and the reference value Pw_Th2 is equal to the non-dominated threshold value (e.g., 55 W). When the power sum Pw_CORE is greater than 43 W, the control signal Sc_GPU is changed to the low level so that the GPU 14 operates in the low frequency operation mode. At the next time instant, if the power sum Pw_CORE is changed to the value smaller than 43 W, the control signal Sc_GPU is changed to the high level so that the GPU 14 returns to the high-frequency operation mode. When the operation is dominated by the GPU 14, the procedures are similar to those mentioned hereinabove, and will be omitted herein.

For example, the computer system 10 of this embodiment is a notebook computer, and the control unit 106 is implemented by an embedded controller (EC). In this embodiment, the computer system 10 further includes a temperature sense unit 106a, which includes first and second temperature sense circuits (not shown) for respectively sensing the temperatures of the CPU 12 and the GPU 14 and correspondingly outputting temperature signals St_CPU and St_GPU to the control unit 106. Consequently, the control unit 106 can obtain the temperatures of the CPU 12 and the GPU 14 according to the temperature signals St_CPU and St_GPU. For example, the heat dissipating module 22 is a fan-type heat dissipating module, and the control unit 106 further provides a fan control signal Sc_Fn to control the rotating speed of the fan of the heat dissipating module. In this embodiment, the adder unit 104 and the comparator units 108a and 108b may also be simultaneously integrated in the embedded controller and thus be implemented by the embedded controller.

Second Embodiment

What is different from the first embodiment is that the reference values Pw_Th1 and Pw_Th2 of the second embodiment can be obtained via a look-up table according to the temperatures of the CPU 12 and the GPU 14.

FIG. 4 shows an example of a look-up table. As shown in FIG. 4, when the temperatures of the CPU 12 and the GPU 14 range between 0 to 49 degrees centigrade, the reference values Pw_Th1 and Pw_Th2 may be equal to 55 W.

With the increases of the temperatures of the CPU 12 and the GPU 14, the rotating speed of the fan of the heat dissipating module 22 is also correspondingly increased. The reference values Pw_Th1 and Pw_Th2 are decreased with the increases of the temperatures of the CPU 12 and the GPU 14 so that the allowed thermal energy emitted from the CPU 12 and the GPU 14 can be lowered. Thus, the computer system 10 of this embodiment can enhance the heat dissipating performance of the heat dissipating module 22 by increasing the rotating speed of the fan, and lower the thermal energy emitted from the CPU 12 and the GPU 14 when the temperatures of the CPU 12 and the GPU 14 are increased. Compared with the conventional computer system, the electrical power sharing circuit 100 of this embodiment can further effectively enhance the heat dissipating performance of the computer system 10.

The reference value Pw_Th2 is substantially decreased with the increase of the temperature of the CPU 12, and the reference value Pw_Th1 is substantially decreased with the increase of the temperature of the GPU 14. As shown in FIG. 4, for example, when the temperatures of the CPU 12 and the GPU 14 are equal to 40 degrees, the reference values Pw_Th1 and Pw_Th2 are equal to 55 W. When the temperatures of the CPU 12 and the GPU 14 are equal to 70 degrees, the reference values Pw_Th1 and Pw_Th2 are equal to 30 W.

FIG. 5 (Prior Art) shows a look-up table of a fan rotating speed and a corresponding CPU temperature in a conventional heat dissipating module. Comparing FIG. 4 with FIG. 5, it is obtained that the rotating speed of the fan in the heat dissipating module 22 of this embodiment is lower than that in the conventional heat dissipating module at the same temperature of the CPU 12 and the GPU 14. For example, when the temperatures of the CPU 12 and the GPU 14 fall between 70 and 84 degrees, the rotating speed of the fan in the heat dissipating module 22 of this embodiment is only 2800 RPM (Revolution Per Minute), while the rotating speed of the fan in the conventional heat dissipating module has to reach 3600 RPM. Consequently, the electrical power sharing circuit 100 of this embodiment may further advantageously lower the rotating speed of the fan in the heat dissipating module 22, and reduce the level of the noise generated by the heat dissipating module 22.

Third Embodiment

In the first embodiment, the reference value Pw_Th1 is equal to the dominated threshold value and the thermal power threshold value Pw_Th2 is equal to the non-dominated threshold value if the operation is dominated by the CPU 12. If the operation is dominated by the GPU 14, the reference value Pw_Th2 is equal to the dominated threshold value, and the reference value Pw_Th1 is equal to the non-dominated threshold value.

However, the difference between the third and first embodiments will be described in the following. In the third embodiment, the reference value Pw_Th1 is equal to the primarily dominated threshold value and the thermal power threshold value Pw_Th2 is the secondarily dominated threshold value if the operation is dominated by the CPU 12. If the operation is dominated by the GPU 14, the thermal power threshold value Pw_Th2 is equal to the primarily dominated threshold value, and the thermal power threshold value Pw_Th1 is the secondarily dominated threshold value.

For example, the primarily dominated threshold value is equal to the dominated threshold value of the first embodiment, and the secondarily dominated threshold value is smaller than the maximum power consumption sum (e.g., 55 W) of the CPU 12 and the GPU 14 and is greater than the primarily dominated threshold value. When the power consumption sum of the CPU 12 and the GPU 14 approaches the maximum power consumption sum, the thermal energy emitted from the CPU 12 and the GPU 14 can be lowered more effectively by the sharing circuit 100, which applies the secondarily dominated threshold value to simultaneously control the CPU 12 and the GPU 14 to operate in the low frequency operation modes in this embodiment.

For example, when the control unit 106 judges that the operation performed by the computer system 10 pertains to the GPU-dominated operation, the thermal power threshold value Pw_Th2 is equal to the secondarily dominated threshold value, which is assumed to be higher than the thermal power threshold value Pw_Th1 (primarily dominated threshold value) by 5 W. For example, if the thermal power threshold value Pw_Th1 is equal to 43 W, the thermal power threshold value Pw_Th2 is equal to 48 W. When the power sum Pw_CORE is greater than 48 W, the comparator units 108a and 108b simultaneously output the low-level control signals Sc_CPU and Sc_GPU to control the CPU 12 and the GPU 14, respectively, so that both the CPU 12 and the GPU 14 operate in the low frequency operation modes. Consequently, the electrical power sharing circuit 100 of this embodiment can effectively lower the thermal energy emitted from the CPU 12 and the GPU 14 by simultaneously lowering the frequencies of the operation clocks of the CPU 12 and the GPU 14 when the power consumption sum of the CPU 12 and the GPU 14 approaches to the maximum power consumption sum.

When the power sum Pw_CORE is lowered to the value between 43 W and 48 W, the comparator unit 108a outputs the high-level control signal Sc_CPU to control the CPU 12 to operate in the high-frequency operation mode, while the control signal Sc_GPU is still kept at the low level so that the GPU 14 still operates in the low frequency operation mode. When the power sum Pw_CORE is lower to the value smaller than 43 W, the comparator unit 108b outputs the high-level control signals Sc_CPU and Sc_GPU to make the CPU 12 and the GPU 14 operate in the high-frequency operation modes. This embodiment is particularly adapted to the condition, in which the heat dissipating module has the smaller size and the smaller heat dissipating ability, or the dominated threshold value is to be set to be smaller.

Test Result

FIG. 6 shows test results of the computer system 10 of the first embodiment and the conventional computer system when several system performance benchmark software tools are executed. In this embodiment, the computer system having the CPU with the Intel Core 2 Duo T7300 processor executes the benchmark tools 3DMark 2005, 3DMark 2006 and PCMark 2005 (items 4 to 8). The items 4 to 8 are the test scores obtained by the computer system of the first embodiment when the reference values Pw_Th1 and Pw_Th2 are equal to 40 W, 35 W, 30 W, 25 W and 20 W, respectively. The items 1 to 3 are the test scores correspondingly obtained by the conventional computer systems using the Core 2 Duo T7300 processor, the Core 2 Duo L7300 low-voltage processor and the Core 2 Duo U7600 ultra-low voltage processor, respectively. The higher test score represents the higher processing performance.

According to the test scores of the items 1 and 4, it is obtained that thermal design power of the heat dissipating module 22 may be effectively decreased from 55 W to 40 W by setting the reference values Pw_Th1 and Pw_Th2 to 40 W. Meanwhile, the computer system 10 showed in item 4 scores close points as a conventional computer system using the heat dissipating module having the thermal design power of 55 W shown in the item 1 in each of the benchmark tool tests. That is to say, the computer system 10 showed in item 4 has close performance as the conventional computer system.

In addition, according to the test scores of the items 2, 5 and 6, the following features can be obtained. Compared with the conventional computer system (thermal design power=37 W) of the item 2 using the Core 2 Duo L7500 low-voltage processor, the computer systems 10 of the items 5 and 6 still can effectively provide better CPU and GPU operation performances via the operation of the electrical power sharing circuit 100 when the disposed heat dissipating module 22 has the lower thermal design power (35 W and 30 W smaller than 37 W). Because the Core 2 Duo L7500 low-voltage processor is dedicated for the notebook computer with the low power consumption, the throughput thereof is limited, the price thereof is high, and the operation frequency thereof is lower (only 1.6 GHz). The circuit provided in the invention only needs to use the cheaper Core 2 Duo T7300 processor to keep the higher operation frequency (2.0 GHz) and achieve the advantage of the low power consumption.

Similarly, according to the test scores of the items 3, 7 and 8, it is obtained that the heat dissipating module 22 of the computer system 10 of the first embodiment has the lower thermal design power (25 W and 20 W) and can effectively provide better CPU and GPU operation performances than that of the conventional computer system (thermal design power=30 W) using the Core 2 Duo U7600 ultra-low voltage processor.

The electrical power sharing circuit of the embodiment can lower the hardware operation resource, which is not associated with the current operation, and can lower its power consumption in response to the operation of the computer system. Thus, the electrical power sharing circuit of this embodiment can effectively lower the overall thermal energy of the computer system and the heat dissipating ability and the size of the heat dissipating module. The electrical power sharing circuit of this embodiment may further effectively make the computer system have the better processing performance when the smaller heat dissipating module is used.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electrical power sharing circuit applied in a computer system, which comprises a central processing unit (CPU) and a graphical processing unit (GPU), the electrical power sharing circuit comprising:

a first sense unit, electrically connected to the CPU, for generating a first sense value;

a second sense unit, electrically connected to the GPU, for generating a second sense value;

a first control unit, electrically connected to the first sense unit, the second sense unit, the CPU and the GPU, for receiving the first sense value and the second sense value; and a second control unit, electrically connected to the first sense unit, the second sense unit and the first control unit, for receiving the first sense value and the second sense value, and providing a reference value to the first control unit, wherein the first control unit controls performances of the CPU and the GPU according to the reference value.

2. The circuit according to claim 1, wherein the first control unit comprises:

an adder unit for adding the first sense value and the second sense value together to obtain a sum of the sense values; and at least one comparator unit for comparing the sum of the sense values with the reference value;

wherein, the reference value comprises a first reference value and a second reference value;

when the sum of the sense values is greater than the first reference value, the comparator unit outputs a first control signal to lower the performance of the GPU; and when the sum of the sense values is greater than the second reference value, the comparator unit outputs a second control signal to lower the performance of the CPU.

3. The circuit according to claim 1, wherein the first control unit and the second control unit are implemented by an embedded controller.

4. The circuit according to claim 1, wherein the performance comprises a power supply, a working clock, an internal frequency multiplier or a power state of the CPU or the GPU.

5. The circuit according to claim 1, wherein the first and second sense units are power sense units.

6. The circuit according to claim 1, wherein the second control unit judges whether an operation currently performed by the computer system pertains to a CPU-dominated operation or a GPU-dominated operation according to the first and second sense values, and correspondingly outputs the reference value;

wherein, the reference value comprises a first reference value and a second reference value;

when the operation pertains to the CPU-dominated operation, the first reference value is equal to a dominated threshold value; and when the operation pertains to the GPU-dominated operation, the second reference value is equal to the dominated threshold value.

7. The circuit according to claim 6, wherein when the operation pertains to the CPU-dominated operation, the second reference value is equal to a non-dominated threshold value, and when the operation pertains to the GPU-dominated operation, the first reference value is equal to the non-dominated threshold value.

8. The circuit according to claim 7, wherein a sum of a maximum power consumption value of the CPU and a maximum power consumption value of the GPU is a maximum power consumption sum, and the non-dominated threshold value is greater than or equal to the maximum power consumption sum.

9. The circuit according to claim 6, wherein the second control unit summates the first and second sense values in a fixed period to correspondingly generate a first summated sense value and a second summated sense value, and obtains a first power ratio and a second power ratio with a maximum power consumption values of the CPU and the GPU, respectively,
wherein when the first power ratio is greater than the second power ratio, the second control unit judges that the operation pertains to the CPU-dominated operation, and when the second power ratio is greater than the first power ratio, the second control unit judges that the operation pertains to the GPU-dominated operation.

10. The circuit according to claim 1, wherein the second control unit judges whether an operation currently performed by the computer system pertains to a CPU-dominated operation or a GPU-dominated operation according to the first and second sense values, and correspondingly outputs the reference value, wherein:
the reference value comprises a first reference value and a second reference value;
when the operation pertains to the CPU-dominated operation, the first reference value is equal to a primarily dominated threshold value; and
when the operation pertains to the GPU-dominated operation, the second reference value is equal to the primarily dominated threshold value.

11. The circuit according to claim 10, wherein when the operation pertains to the CPU-dominated operation, the second reference value is equal to a secondarily dominated threshold value, and when the operation pertains to the GPU-dominated operation, the first reference value is equal to the secondarily dominated threshold value.

12. The circuit according to claim 10, wherein the second control unit summates the first and second sense values in a fixed period to correspondingly generate a first summated sense value and a second summated sense value, and obtains a first power ratio and a second power ratio with a maximum power consumption values of the CPU and the GPU, respectively,
wherein when the first power ratio is greater than the second power ratio, the second control unit judges that the operation pertains to the CPU-dominated operation, and when the second power ratio is greater than the first power ratio, the second control unit judges that the operation pertains to the GPU-dominated operation.

13. The circuit according to claim 1, further comprising:
a first temperature sense unit and a second temperature sense unit for sensing temperatures of the CPU and the GPU and providing a first temperature sense value and a second temperature sense value, respectively;
wherein the second control unit further obtains the reference value via a look-up table according to the first and second temperature sense values.

14. An electrical power sharing method applied in a computer system, which comprises a central processing unit (CPU) and a graphical processing unit (GPU), the method comprising the steps of:
(a) generating a first sense value and a second sense value respectively corresponding to the CPU and the GPU, a sum of the first sense value and the second sense value is a power sum;
(b) judging whether an operation currently performed by the computer system pertains to a CPU-dominated operation or a GPU-dominated operation according to the first sense value and the second sense value, and correspondingly generating a first reference value and a second reference value; and
(c) comparing the power sum with the first reference value, and when the power sum is greater than the first reference value, lowering the performance of an operation clock of the GPU; and comparing the power sum with the second reference value, and when the power sum is greater than the second reference value, lowering a frequency of an operation clock of the CPU.

15. The method according to claim 14, wherein the first sense value is a first power value, the second sense value is a second power value, and the first and second power values respectively correspond to power consumption values of the CPU and the GPU.

16. The method according to claim 15, wherein when the operation pertains to the CPU-dominated operation, the first reference value is equal to a dominated threshold value, and when the operation pertains to the GPU-dominated operation, the second reference value is equal to the dominated threshold value.

17. The method according to claim 16, wherein a sum of a maximum power consumption value of the CPU and a maximum power consumption value of the GPU is a maximum power consumption sum, when the operation pertains to the CPU-dominated operation, the second reference value is equal to a non-dominated threshold value, and when the operation pertains to the GPU-dominated operation, the first reference value is equal to the non-dominated threshold value, wherein the non-dominated threshold value is greater than or equal to the maximum power consumption sum, and the dominated threshold value is smaller than the maximum power consumption sum.

18. The method according to claim 15, wherein when the operation pertains to the CPU-dominated operation, the first reference value is equal to a primarily dominated threshold value, and when the operation pertains to the GPU-dominated operation, the second reference value is equal to the primarily dominated threshold value.

19. The method according to claim 18, wherein when the operation pertains to the CPU-dominated operation, the second reference value is equal to a secondarily dominated threshold value, and when the operation pertains to the GPU-dominated operation, the first reference value is equal to the secondarily dominated threshold value, wherein the primarily dominated threshold value and the secondarily dominated threshold value are smaller than the maximum power consumption sum, and the primarily dominated threshold value is greater than the secondarily dominated threshold value.

20. The method according to claim 15, wherein the step (b) comprises:
(b1) summating the first and second power values in a fixed period to correspondingly generate a first summated power and a second summated power;

(b2) obtaining a first power ratio according to the first summated power and a maximum power consumption value corresponding to the CPU, and obtaining a second power ratio according to the second summated power and the maximum power consumption value corresponding to the GPU; and (b3) when the first power ratio is greater than the second power ratio, judging the operation as the CPU-dominated operation, and when the second power ratio is greater than the first power ratio, judging the operation as the GPU-dominated operation.

21. The method according to claim 15, wherein the step (b) further comprises:

(b4) receiving a first temperature signal and a second temperature signal respectively corresponding to temperatures of the CPU and the GPU; and (b5) obtaining the second reference value and the first reference value via a look-up table according to the first and second temperature signals, respectively.

22. The method according to claim 21, wherein when the temperatures of the CPU and the GPU are equal to a first temperature, the first and second reference values are equal to a first corresponding value, and when the temperatures of the CPU and the GPU are equal to a second temperature, the first and second reference values are equal to a second corresponding value, wherein the first temperature is greater than the second temperature, and the second corresponding value is greater than the first corresponding value.

* * * * *